United States Patent [19]

Warren

[11] 4,137,838
[45] Feb. 6, 1979

[54] MEANS FOR BREAKING AND SEPARATING EGGS

[76] Inventor: William H. Warren, 729 S. Main St., Centerville, Mass. 02632

[21] Appl. No.: 755,236

[22] Filed: Dec. 29, 1976

[51] Int. Cl.² .......................... A23J 1/09; A47J 43/14
[52] U.S. Cl. ...................................... 99/500; 99/577; 99/582
[58] Field of Search ................................ 99/497–500, 99/568, 581, 582, 577, 578

[56] References Cited

U.S. PATENT DOCUMENTS

| 1,988,030 | 1/1935 | Young et al. | 99/498 |
| 3,142,322 | 7/1964 | Shelton | 99/500 |
| 3,455,356 | 7/1969 | Classen | 99/498 |

FOREIGN PATENT DOCUMENTS

| 510794 | 8/1939 | United Kingdom | 99/498 |

Primary Examiner—Harvey C. Hornsby
Assistant Examiner—Timothy F. Simone
Attorney, Agent, or Firm—Holland, Armstrong, Wilkie & Previto

[57] ABSTRACT

An improved egg breaking machine is described of the type in which a plurality of cooperating egg cracking heads and separators carried by a drive means, such as a roller chain, automatically crack and drain eggs and separate the liquid egg yolk and white. The drive chain carries the cracking head and separator combinations through egg loading, cracking, draining, and yolk and white separating positions. An improved cracker head is disclosed which operates in three automatically controlled positions including a fully closed, partially opened, and a fully opened position whereby the initial and subsequent shell drainage are facilitated. Additionally, an improved cracking head and separator mounting and spacing control means is disclosed for improving the drainage from the egg to the separator.

10 Claims, 18 Drawing Figures

MEANS FOR BREAKING AND SEPARATING EGGS

BACKGROUND OF THE INVENTION

The present invention relates to improvements in automatic egg breaking machinery and more particularly to an improved cracking head and head control and to an improved cracking head and egg separator positioning means for use on an automatic egg breaking machine.

There are various types of automatic egg breaking machines previously used or presently in use where eggs are fed into the machine and where the eggs are then automatically cracked and opened and drained. The machines normally also include separating devices which enable them, when desired, to separate the liquid egg yolk from the liquid egg white.

Such prior machines are described, for example, in prior U.S. Pat. Nos. 3,190,328, 3,455,356, and 3,589,419 dated June 22, 1965, July 15, 1969, and June 29, 1971, respectively.

Egg cracking and separating means is disclosed herein which provides for a more efficient and complete draining and separating action and with a more complete control of the separation of the egg yolk from the egg white. The improved means also is adapted for operating at higher speeds and for occupying a minimal amount of floor space. It is also relatively easily handled by a single operator.

The breaking machine mounts a large number of individual egg cracking heads and cooperating egg separators on drive chains which carry them around a horizontal path. During the egg cracking and draining and separating operations, the egg shells are held in the improved cracking head. A cooperating separator is mounted below each cracking head and is provided with an improved liquid receiving action minimizing premature yolk breakage and thereby facilitating an efficient yolk and white separation.

Accordingly, an object of the present invention is to provide an improved egg breaking and separating machine capable of more efficient and higher speed operation.

Another object of the present invention is to provide an improved egg cracking head for an automatic egg breaking machine having improved egg draining characteristics.

Another object of the present invention is to provide an improved egg cracker head and egg separator combination and control providing improved cracker drain action.

Other and further objects of the invention will be obvious upon an understanding of the illustrative embodiments about to be described or will be indicated in the appended claims, and various advantages not referred to herein will occur to one skilled in the art upon employment of the invention in practice.

BRIEF DESCRIPTION OF THE DRAWINGS

A preferred embodiment of the invention has been chosen for purposes of illustration and description and is shown in the accompanying drawings, forming a part of the specification, wherein:

FIG. 3 is a perspective view of the drive system for the egg breaking and separating machine of the invention.

DESCRIPTION OF THE PREFERRED EMBODIMENT

As indicated above, the improvements of this invention are incorporated in the egg cracking heads and in certain control means for adjusting the cracking head operating positions and are also incorporated in a related mounting and control means for a cracking head and separator assembly for improved egg drainage. It will be seen that these improvements can be utilized in cracking heads and cracking head-separator assemblies in a variety of overall egg breaking machine configurations.

A preferred embodiment of an egg breaking machine incorporating the improvements of the invention has been chosen for descriptive purposes and the improved cracking head and cracking head-separator assembly will now be described, by way of example, as incorporated in that machine.

In order to clarify a subsequent detailed description of the improvements, the preferred embodiment of the overall egg breaking machine and its operation will first be described briefly.

Figure 1:
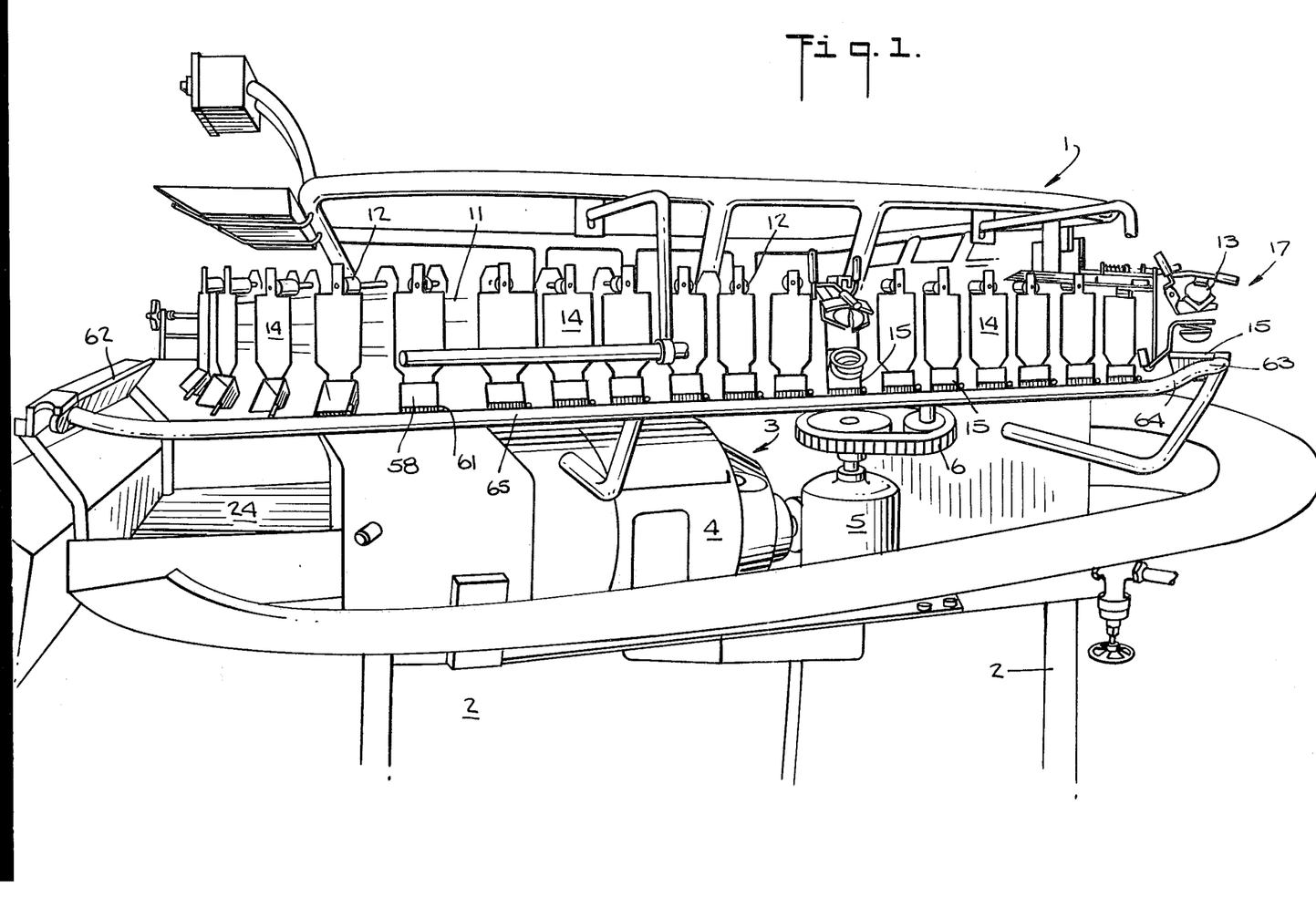
FIG. 1 is a perspective view of an egg breaking and separating machine in accordance with the present invention.

FIG. 1 illustrates the overall egg breaking machine 1. It comprises a base including support legs 2 and a machine drive system 3 positioned within the base. FIG. 3 illustrates the drive system 3 including an electric drive motor 4 coupled through a speed reduction means 5 and a drive chain 6 to a main drive shaft 7. A drive sprocket 8 mounted on the top of the main drive shaft 7 together with three similar idler sprockets 9 support and drive the main machine roller chain 10. The machine base includes a roller support rail 11 (FIGS. 1 and 15) which provides a support and guide surface for the individual rollers 12 provided for each of the cracking heads 13 on a cracking head mounting bracket 14.

Figures 15, 17:
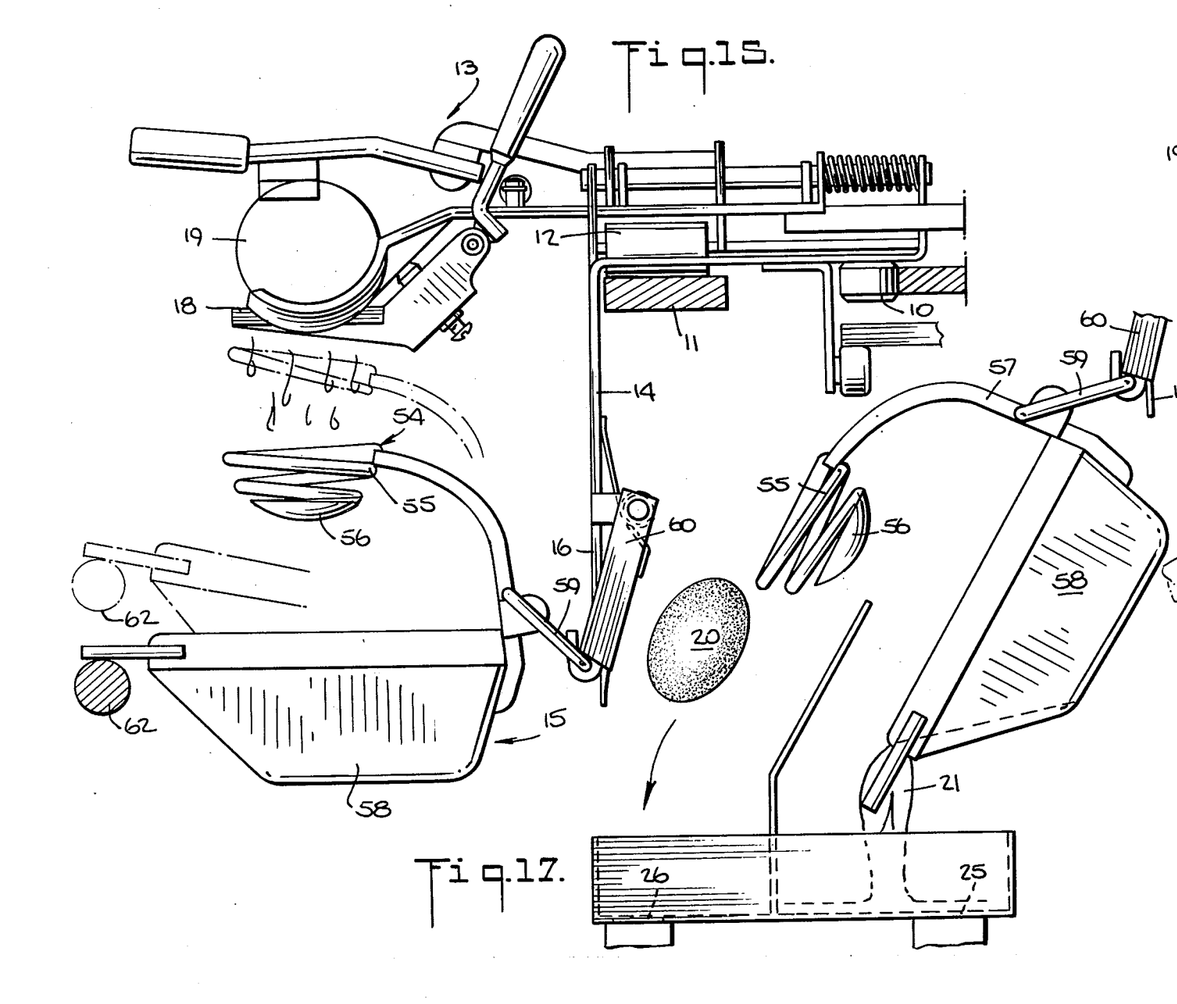
FIG. 15 is a side elevational view of an egg cracker and separator assembly illustrating the relative positions of the cracker and separator at the initial draining and subsequent positions.
FIG. 17 is a side elevational view of the separator at the yolk and white dumping position.

As best illustrated in FIG. 15, each of the cracking heads 13 is attached to the roller chain 10 by means of a generally L-shaped mounting bracket 14. The cracking heads 13 are releasably attached to the upper portion of the brackets 14 and a cooperating separator 15 is releasably attached to the downwardly extending portion 16 of each mounting bracket 14.

Figure 2:
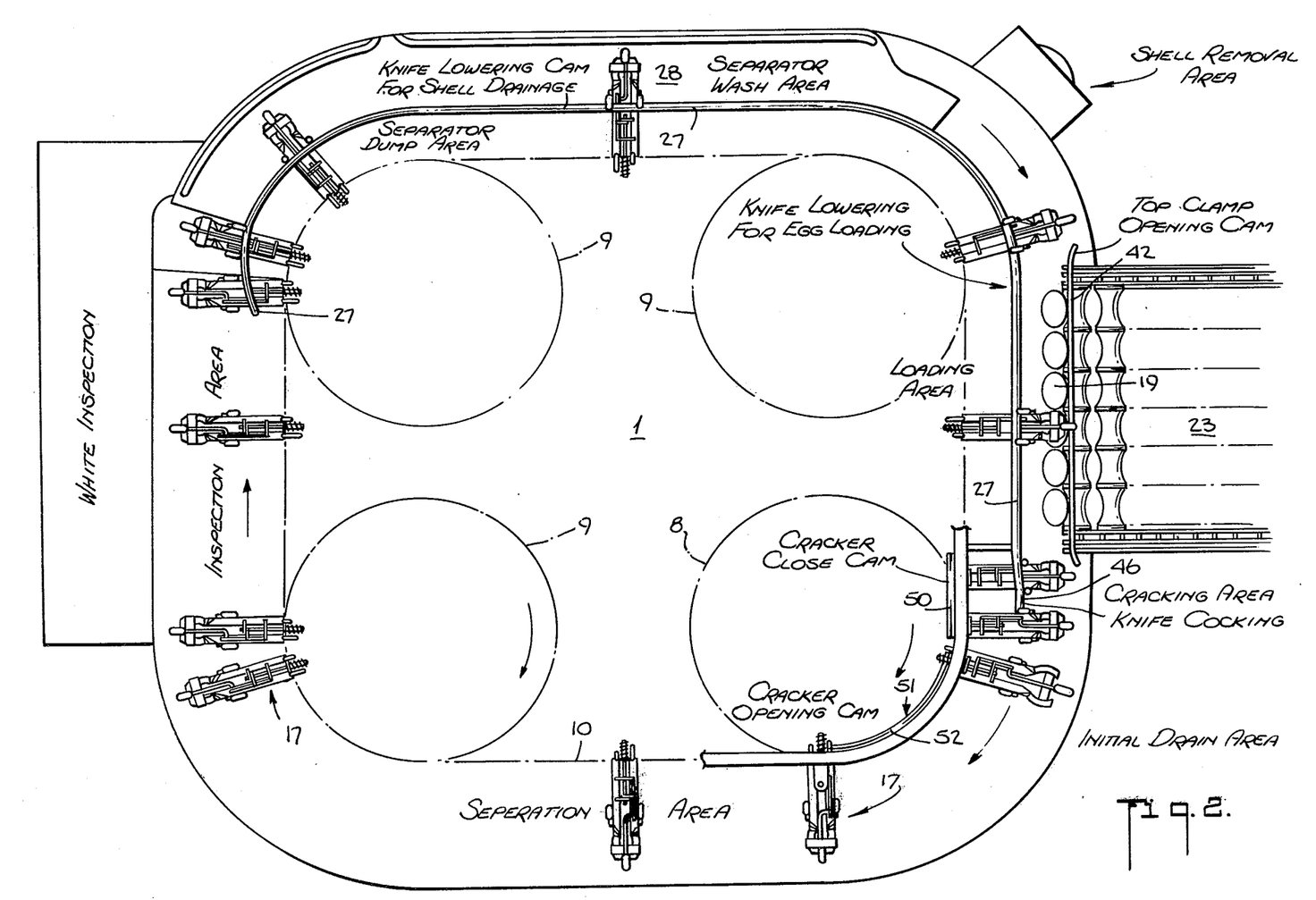
FIG. 2 is a top plan view illustrating the path of the separator heads on their drive chain and the several operating areas.
Figure 4:
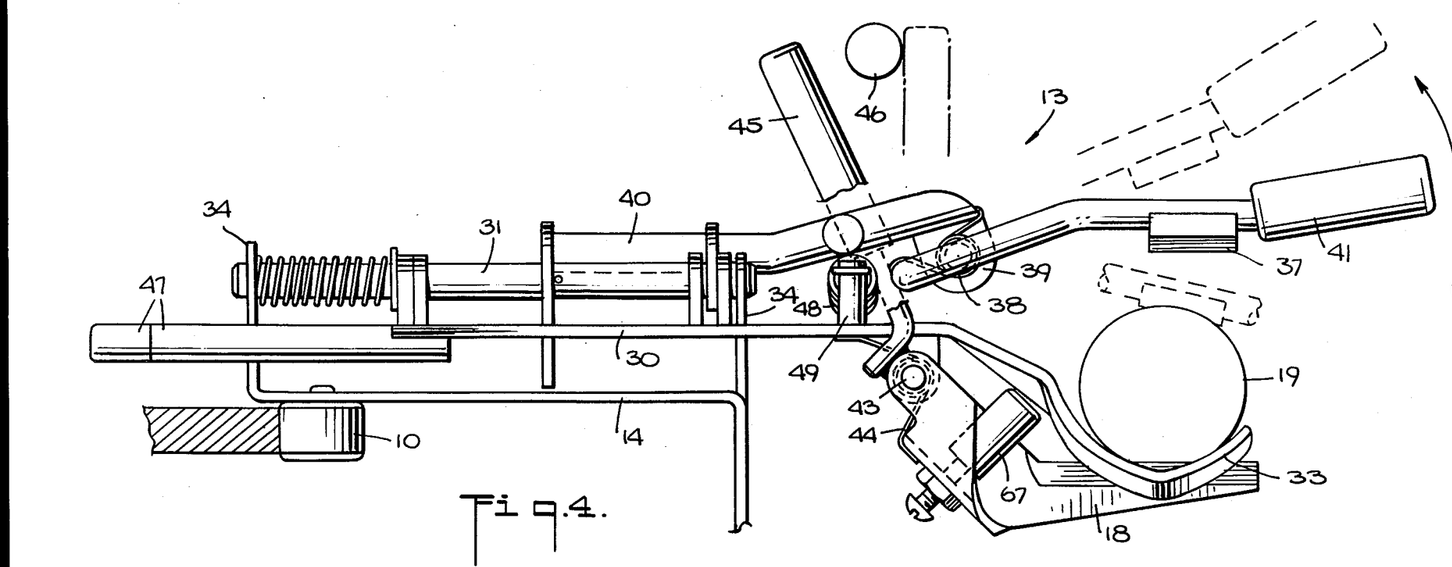
FIG. 4 is a detailed side elevational view of an improved egg cracking head.
Figure 5:
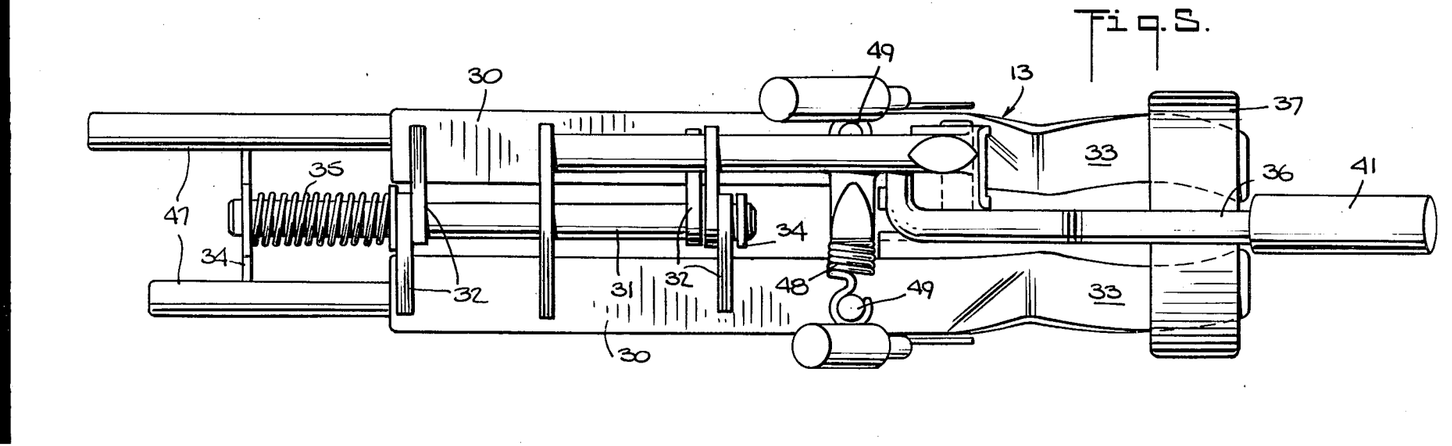
FIG. 5 is a top plan view of the egg cracking head of FIG. 4.

As the roller chain 10 is continuously driven around the generally rectangular path, illustrated in FIG. 2, it carries the cracking-separator assemblies 17 through the several operating areas. The functioning of the cracking heads 13 and the separators 15 at these areas will be described in greater detail in connection with the following detailed descriptions of the cracking heads 13 and the cracking head-separator assemblies 17. A preliminary brief description of the movement of the cracking head-separator assemblies 17 through the operating areas will first be given to describe the overall operation of the machine.

Figure 7:
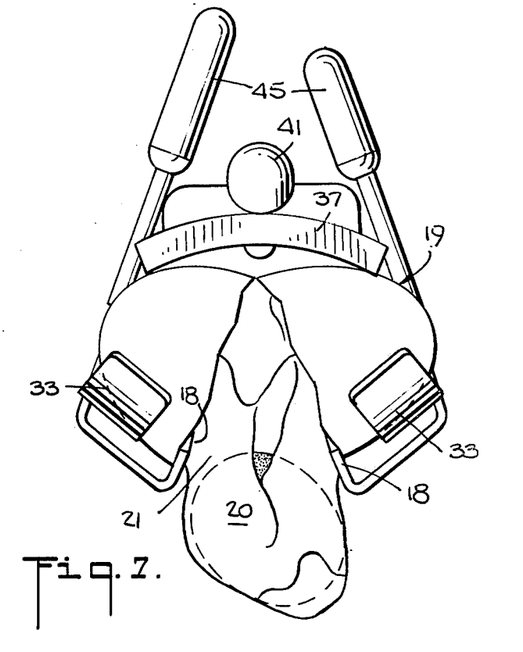

At the loading area, a row of six eggs 19 (FIG. 2) is periodically transferred by a row conveyor 23 into six adjacent moving cracking heads 13. Thereafter, the cracking heads 13 continue their movement on the roller chain 10 in a clockwise direction (referring to FIG. 2) into the egg cracking position. In this area, the knives 18 (FIG. 15) are cocked and released, as will be more fully described below, to crack each egg 19. While still at the corner drive sprocket 8, each of the cracking heads 13 is then swung open to its draining position as illustrated in FIGS. 7 and 15. The egg yolk 20 and the egg white 21 drain downwardly into the separator 15. The separating action occurs in the separator 15 as it moves along the separation area and around in front of the machine operator through the inspection area. During this time, and as will also be described more fully below, the cracking heads 13 return to a partially open position with the cracking knives 18 engaging the egg 19 shell halves to hold them in place in the cracking heads 13 while the egg white 21 continues to drain downwardly into the separators 15. At the inspection area, the operator observes the cracking head-separator assembly to check for spillage of yolk into the white pan or for possible unacceptable egg yolks or white such as blood spotted product. When the operator detects such problems, the separator 15 is dumped by releasing it from its support rail 62 (FIG. 15) dumping the product into a reject tray 24 (FIG. 1). Separators 15 which have been found to contain acceptable egg yolk and egg white are carried to the dump area (FIGS. 2 and 17) where the separator support rail 62 permits the separators 15 to swing downwardly to the position illustrated in FIG. 17, draining the egg white 21 into one collecting pan 25 and the egg yolks 20 into a spaced collecting pan 26. The cracking-separator assemblies 17 now move to the loading position for another cycle as the cracking heads 13 are carried through the shell removal position and the separators 15 move through the optional wash.

Figure 9:
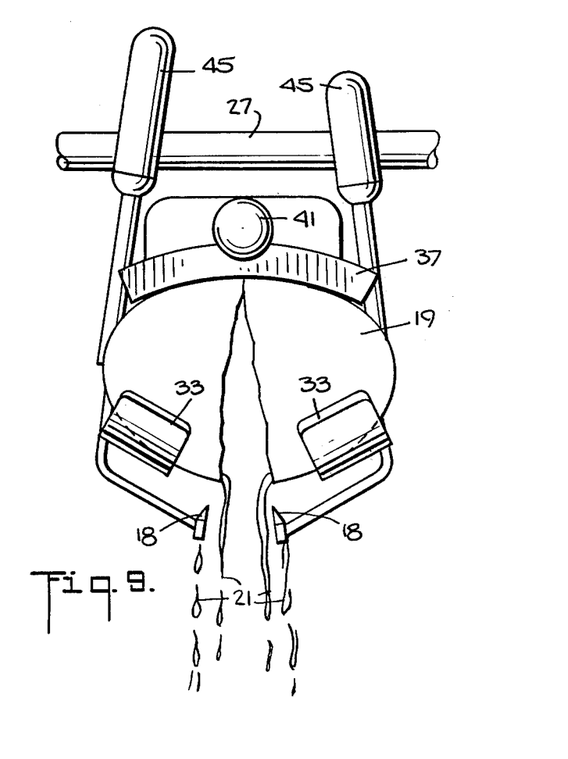

While the separators 15 are moved through the dumping and optional washing areas, the cracking heads 13 are left in their partially open position with the knives 18 lowered by a knife lowering cam 27 so that they clear the egg 19 shells as seen in FIG. 9. This permits a final draining of the egg white into a whole egg or other collecting pan 28 (FIG. 2).

The Improved Egg Cracking Head

The preferred embodiment of the improved cracking head 13 will now be described with particular reference to FIGS. 4 through 12. Each of the cracking heads 13 has a pair of adjacent egg support arms 30 pivotally mounted with respect to each other on an elongated pivot pin 31. The support arms 30 are attached to the pin 31 by means of spaced hinge members 32. The outer ends of both support arms 30 are formed with a generally concave egg support surfaces 33 for receiving and supporting the eggs 19 during the cracking and draining operations. The elongated pivot pin 31 also serves to releasably mount each of the cracking heads 13 on upwardly extending spaced flanges 34 on the support brackets 14. A compressed coil spring 35 holds each cracking head 13 in place by urging the cracking head toward the opposite flange 34 and permits the cracking head 13 to be removed when the pivot pin 31 is pushed to the left (FIG. 4) against the force of the coil spring 35. The eggs 19 are held in position in the cracking heads 13 by a holddown arm 36 preferably having a curved egg gripping pad 37 at its outer end. The pad 37 is urged downwardly against the egg 19 by a coil spring 38 positioned at the pivot connection 39 between the holddown arm 36 and the arm support member 40.

A low cam follower 41 is attached to the outer end of the holddown arm 36 which engages an opening cam 42 (FIG. 2) as each cracking head 13 moves through the egg loading area adjacent conveyor 23 to permit the eggs 19 to be fed into the cracking heads 13. An egg cracking knife 18 is pivotally mounted at 43 on each of the support arms 30. Coil springs 44 at the pivotal mountings 43 urge each of the knives 18 upwardly towards their egg cracking positions as controlled by adjustable stops 67. Low friction cam followers 45 on the upper portions of the knives 18 are positioned to engage the knife positioning cam 27 on the machine 23 shown in FIG. 2. The terminal end 46 of the cam 27 is shaped to first cock the knives 18 by swinging them downwardly and then permits the knives 18 to move sharply upwardly and against the eggs 19 when the cam 27 terminates and releases the knives 18.

Figure 6:
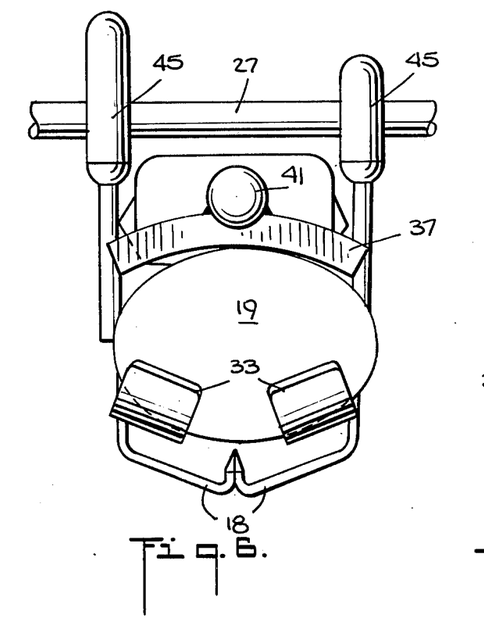
FIGS. 6, 7, 8 and 9 are front elevational views of the egg cracking head of FIG. 4 shown for successive operations during the cracking and draining operation.
Figure 8:
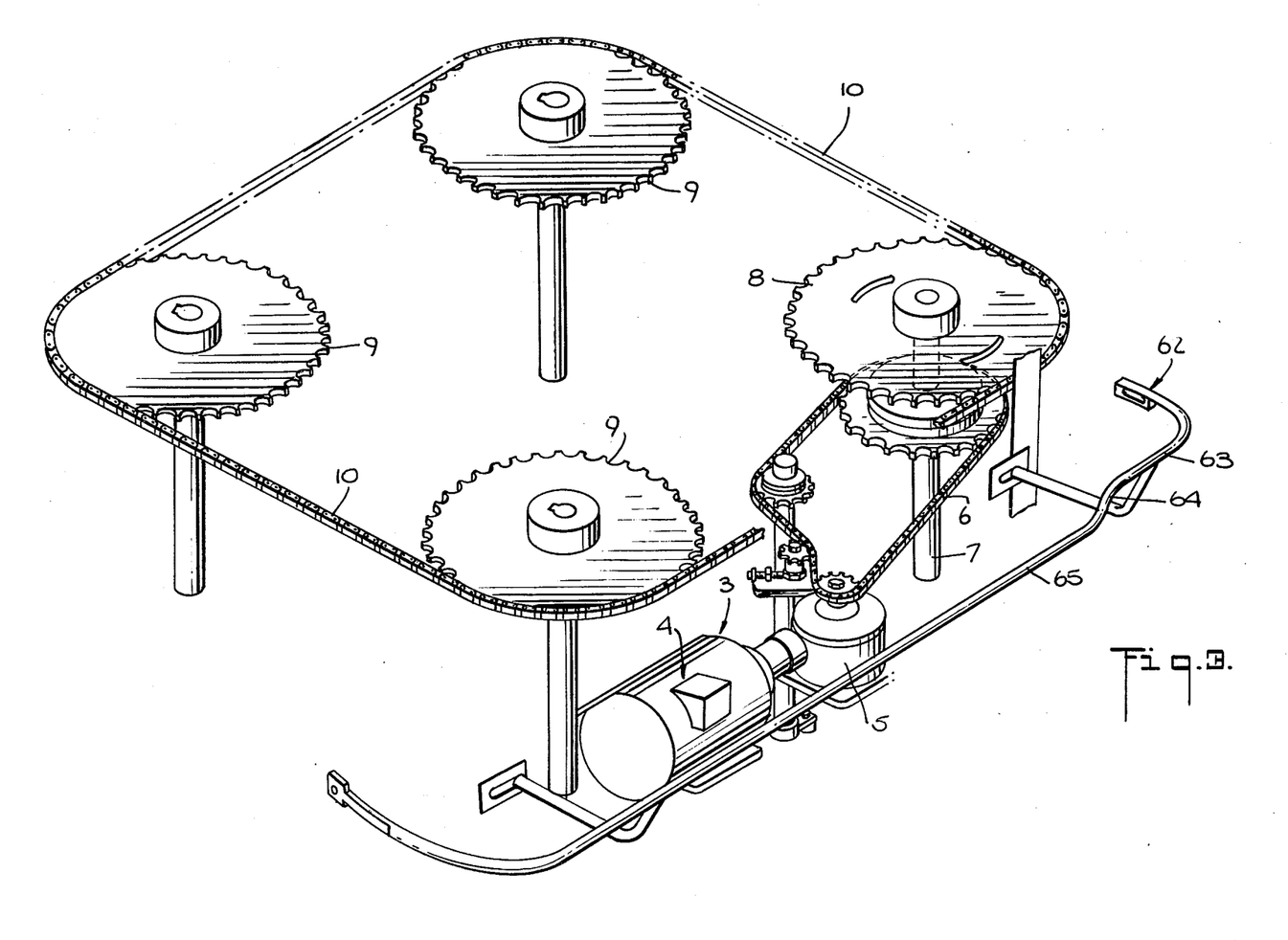
Figures 10, 11, 12, 13:
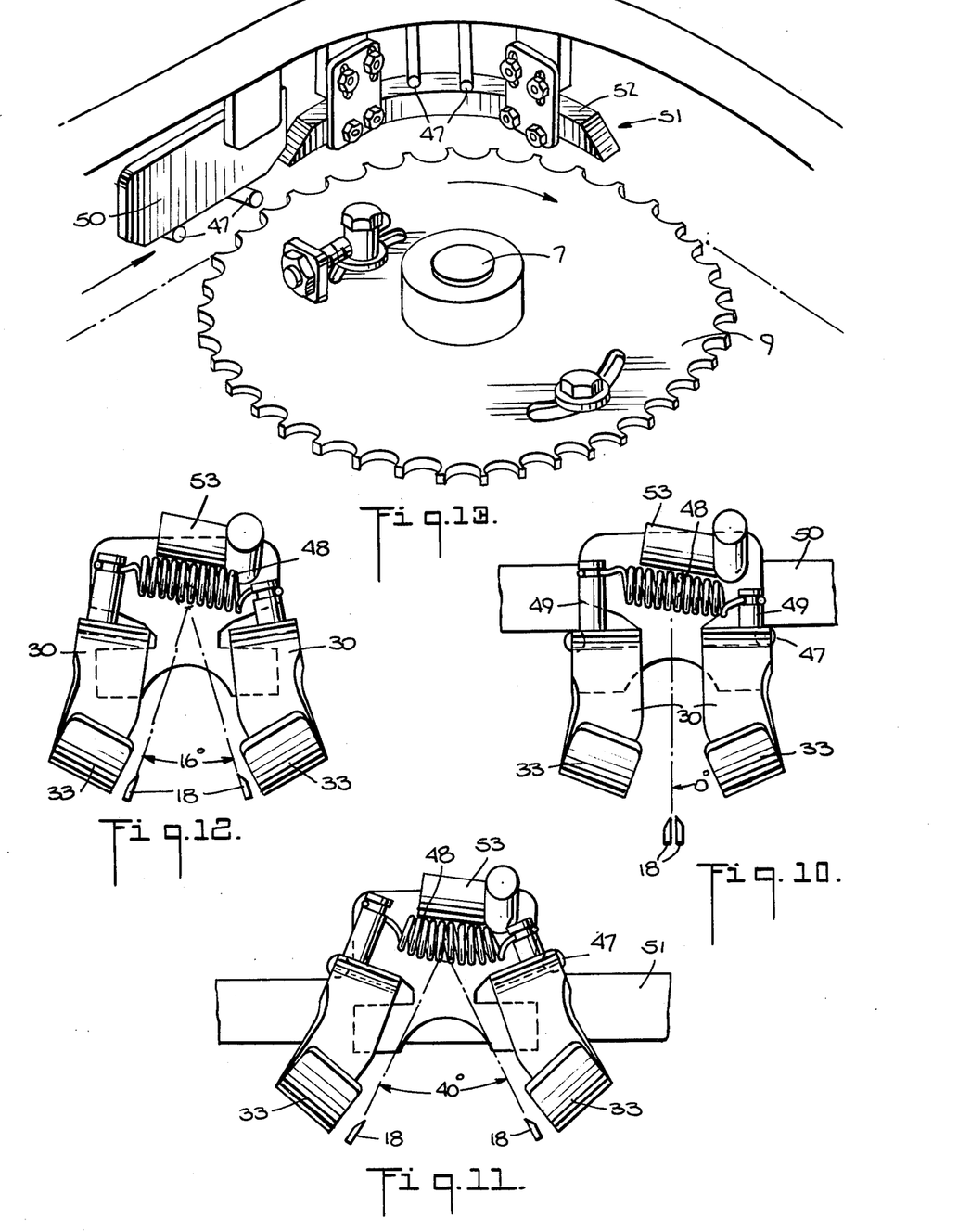
FIGS. 10, 11 and 12 are front elevational views of the cracker head corresponding to the positions of FIGS. 6, 7 and 8, respectively, illustrating the cracker head position control means for three operating positions.
FIG. 13 is a perspective view illustrating the cracker head control cams at the egg cracking and initial draining areas.

The two egg support arms 30, which pivot about the pivot pin 31, have three positions relative to one another, as illustrated in FIGS. 6 and 10; a fully opened position with the support arms 30 swung apart from one another to hold a cracked egg 19 in an opened drain position, illustrated in FIGS. 7 and 11; and an intermediate or partially opened position for white drainage, as illustrated in FIGS. 8 and 12. The means which controls these positions of the cracking heads 13 comprises a rearwardly extending cam pin 47 on each support arms 30 and a control spring 48 coupled between suitable connectors 49 on the support arms 30.

The operation of these control means will now be described more fully for the three positions.

The Fully Closed Position of the Cracking Head

The eggs 19 are cracked by the penetration of the two knives 18 of the cracking head 13. This is done by first placing the two knives 18 in engagement with one another and by then moving the two knives 18 against and through the egg 19 shell causing the shell to crack at the line of entry. After the cracking is completed, the cracking head 13 arms 30 are swung away from one another with the knives 18 still penetrating the egg shell thereby causing the shell to swing open to the drain position illustrated in FIG. 7.

The cracking heads 13 are moved to their fully closed position with the knives 18 touching one another, as illustrated in FIG. 6, by the head closing cam 50 positioned just beyond the egg loading area. The lower surface of the cam 50 presses downwardly on the two cam pins 47 causing the support arms 30 to swing towards one another about the pivot pin 31. The lower surface of the head closing cam 50 extends along a portion of the path of the cracking heads 13 corresponding to the cocking of the knives 18 by and the subsequent release of the knives 18 by the portion 46 of the knife control cam 27. This closing of the cracking head support arms 30 to the fully closed position moves the control spring 48 below the pivot pin 31 causing the spring 48 toggle action to tend to hold the closed position. When each cracking head 13 moves beyond the closing cam 50, an opening cam 51 engages the bottoms of cam pins 47 causing the two support arms to swing back to their fully opened or drain position as illustrated in FIGS. 7 and 11.

The Fully Opened Position for the Cracking Heads

After the above described cracking operation, it is necessary to rapidly drain the egg yolk and the egg white from the cracked egg 19. This is done by swinging the two support arms 30 away from each other to the fully opened position. In this position the two halves of the egg 19 shell have been moved apart a substantial distance permitting free draining of the yolk and the white from the cracking heads 13 downwardly to the separators 15. This position of the cracking heads 13 is obtained by the opening cam 51 having an upwardly directed camming surface 52. The upper surface 52 of the opening cam 51 engages the spaced cam pins 47 pushing them upwardly so that the two support arms 30 swing a substantial distance away from one another together with their interconnected knives. During this swinging action, the control spring 48 is simultaneously stretched and forced against a control block 53 positioned immediately above the spring 48. This deforming and stretching action develops a closing force in the spring 48 which tends to return the cracking head to its partially opened position which corresponds to the unstressed condition for the control spring 48 just below the control block 53.

The Normal or Partially Opened Position

As already indicated, the control spring 48 is proportioned to be in an unstressed condition and lying below of only lightly against the control block 53 when the support arms 30 are in their partially opened position. The result of this is that each of the cracking heads 13 returns to its partially opened position as it moves beyond the opening cam 51 discussed above. The opening cam 51 terminates as the cracking heads 13 move off of the arcuate portion of the chain 10 path at the drive sprocket 8 and the cracking heads 13 automatically assume their partially opened position at this point. The use of the partially opened condition permits the further drainage of the egg 19 shells during the separation, inspecting, and dumping operations. This position permits a maximum number of cracking heads 13 to be placed adjacent one another on the roller drive chain 10 due to minimal space requirements for the individual cracking heads 13 and facilitates shell retention in the cracking heads 13. As the cracking heads 13 move, in their partially opened position from the cracking area, the knives 18 remain in engagement with the halves of the egg 19 shells under the force of the knife springs 44 in the positions illustrated in FIG. 8. This position of the knives 18 permits additional drainage of egg white while firmly retaining the egg 19 shells in the egg cracking heads 13 as they move through the separating and inspection and dumping areas. After the cracking heads 13 leave the dumping area, the support arms 30 remain in their partially opened position and the knives 18 are partially lowered to a position clear of the egg 19 shells by knife cam 27 in the manner illustrated in FIG. 9. This permits a final draining of the egg 19 shells and particularly of any egg white which may have become dammed behind the knives 18 during the earlier draining operation. The lowered knives 18 also facilitate the loading operation as the partially opened cracking heads 13 move adjacent to the egg conveyor 23 for the loading operation.

The three positions for the egg support arms of the cracking heads 13 are obtained by the use of one short cam 50 for the closed position and another short cam 51 for the fully opened position with the partially opened or normal position being obtained independently of cams under the control of the above described control spring 48. As indicated, the opening cam 51 is positioned on the machine top adjacent to the arcuate portion of the cracking head path around the drive sprocket 8. In this position, the cracking heads 13 diverge in a radial manner from one another thereby providing for a maximum opening of the support arms 30 permitted by the increased spacing between the outer ends of the cracking heads 13. This relationship is taken advantage of for providing a substantial and adequate opening of the egg 19 shells sufficient to permit ready drainage of the yolk 20 and a principal portion of the egg white 21.

The Improved Cracking Head-Separator Assembly

As already described, the liquid egg yolk 20 and egg white 21 which drain from the cracking heads 13 flow into cooperating separators 15 as the cracking head-separator assemblies 17 move through an initial drain area and along the separation area.

An improved cracking head and separator combination and control means is described below which provides for a relatively rapid draining of the egg yolk 20 and the egg white 21 without premature egg yolk rupture and with an efficient and substantially complete transfer of the egg white 21 from the broken egg 19 shells to the separators 15. This improvement is incorporated in the mounting and control means for a separator 15 positioned below a cracking head 13. While it will be described with particular reference to the preferred embodiment of the cracking head described above and a preferred embodiment of a separator, it is clear that the control means of the invention may be utilized with differing cracking heads and separators in which the specific means for cracking the eggs and for separating the yolk from the white may differ. It may be utilized, for example, with the differing separator head disclosed in U.S. patent application Ser. No. 606,971 filed Aug. 22, 1975 entitled METHOD AND MEANS FOR SEPARATING EGG WHITES FROM EGG YOLKS or other separators.

Figure 16:
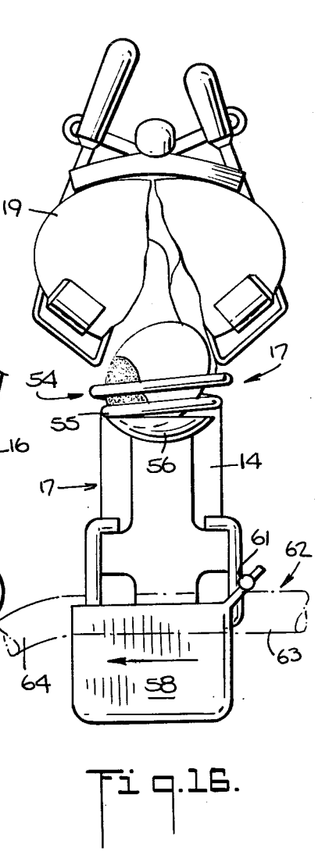
FIG. 16 is a front elevational view of the cracker head and separator assembly corresponding to FIG. 15.
Figure 18:
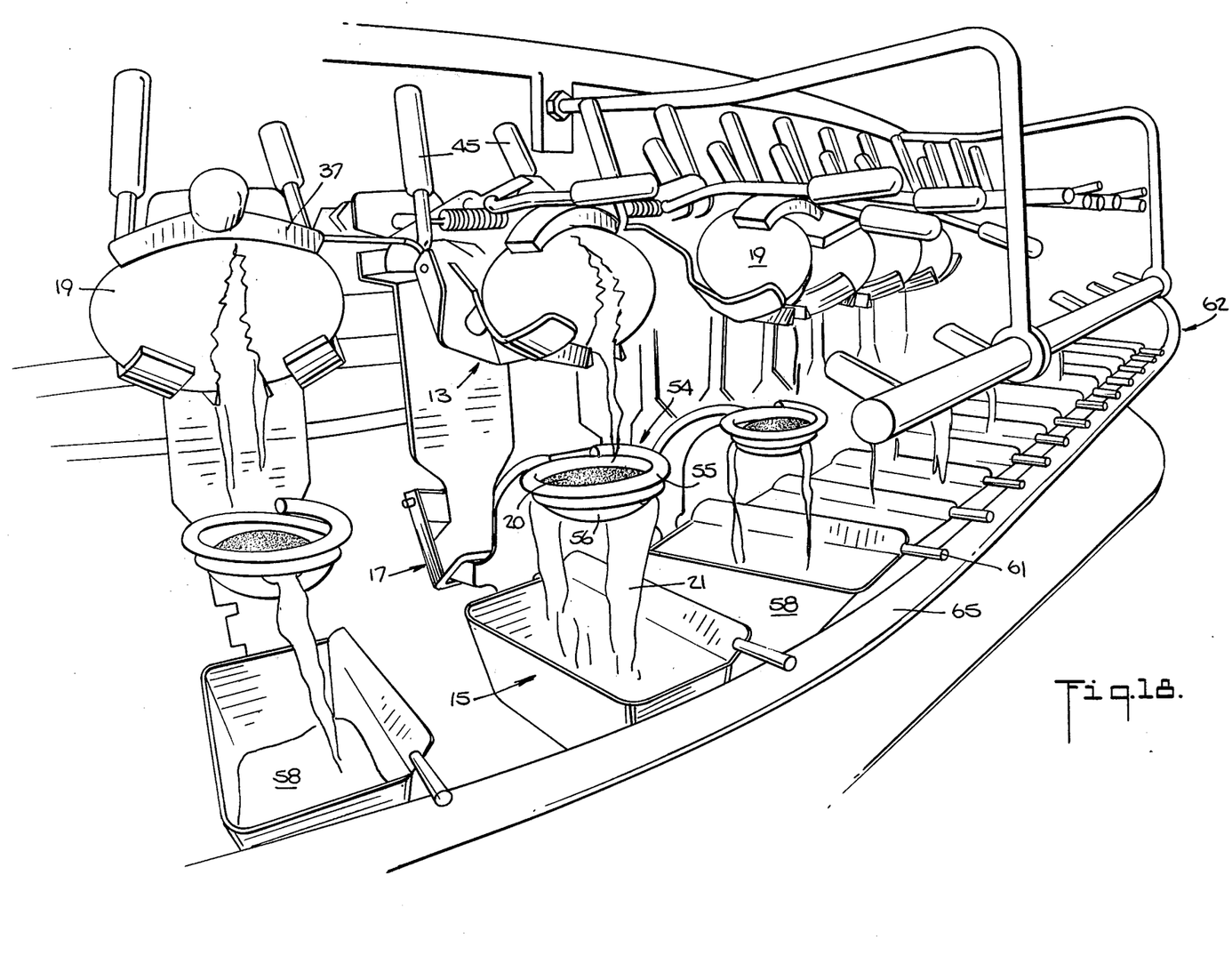
FIG. 18 is a perspective view illustrating the egg cracking heads in their partially open or normal drain positions.

As also already described, the egg draining and separating operation are performed by a plurality of identical cracking head-separator assemblies 17 mounted on mounting brackets 14 carried around the breaking machine 1 by the roller chain conveyor 10. A preferred embodiment of the cracking head-separator assembly 17 is illustrated in FIGS. 15 and 16. The separator 15 includes a yolk support 54 at its top including a generally spirally shaped drain portion 55 attached to an imperforate concave upwardly facing the yolk cup 56. These members are attached to a vertical support 57 extending upwardly from a white pan 58. The separator 15 is releasably attached by a hinged link 59 and a spring clamp 60 to the bottom 16 of the mounting bracket 14. The opposite end of the white pan includes a cam follower pin 61 extending outwardly for engagement with separator support cam members. The positions of the separators 15 at the operating area is controlled by these separator cams including an elongated separator cam 62 extending from the loading area through the drain area and the separation area. A cam bar 63 extends across the inspection area which is a continuation of the separator cam 62 and which may provide for selective dumping of the separators 15 by means which are not part of the present inventon and which includes means for the lowering of the separators 15 to the yolk and egg white dumping position illustrated in FIG. 17.

Figure 14:
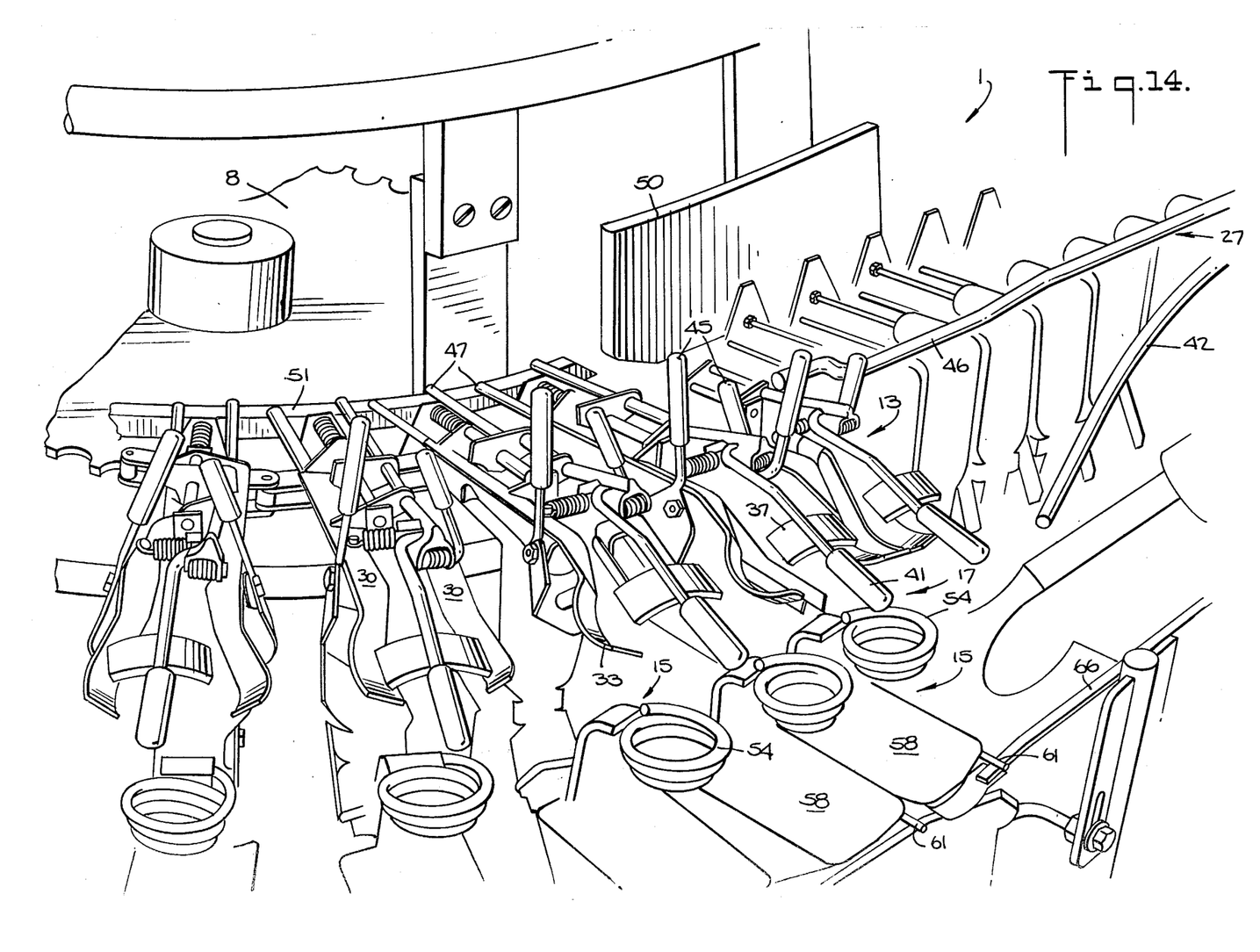
FIG. 14 is a perspective view illustrating cracking heads at the egg cracking and initial draining areas.

A principal control element for the present improvement is the separator cam 62 which extends through the drain area and which has a spacing portion 63 which leads through a lowering portion 64 into an elongated generally horizontal portion 65 extending through the separation area. This control by separator cam 62 will now be described with particular reference to FIGS. 1, 14 and 15.

During and immediately after the loading operation, the position of the separator 15 has been brought to a generally horizontal position by a separate lift cam 66 (FIG. 14) which controls the separator 15 position as each cracking head-separator assembly 17 moves into the cracking area. The initial portion 63 of the separator cam 62 at the drain area is positioned to raise the yolk support 54 to a position immediately below the cracked egg in the cracking head 13. This lifting of the yolk support 54, as seen in FIG. 15, results from a swinging motion of the separator 15 on the hinged link 59 which results in the lifting of the yolk support 54 to the above described raised position. In this position, the yolk 20 slides smoothly and gently into the yolk support 54 without any significant drop and with no tendency to rupture as a result of the drainage action. Simultaneously, the white 21 also flows downwardly around the yolk 20 and over the yolk support 54 and through the slots 66 therein downwardly into the white pan 58. When the cracking heads 13 approach the end of the closing cam 50 the lowering portion 64 of the separator cam 62 is inclined downwardly causing the separators 15 to swing down moving the yolk support 54 away from the cracking heads 13. This provides two advantageous results. In the first place, the downward movement tends to draw the remaining white 21 clear of the egg 19 shells and the knives 18 so that it flows downwardly through and over the yolk support 54 and into the white pan 58. Secondly, the increased spacing which is now maintained as the separators 15 move through the entire separating area facilitates the white drainage as the result of the increased gravity force present in the lengthened streams of egg white 21 extending from the knives 18 and the egg 19 shells to the separators 15. The result of this separator position control is a more rapid and efficient and complete drainage of egg white 21 from cracked eggs 19.

It will be seen that important improvements have been described for use on egg breaking machines including a cracking head with improved position control for positive and efficient egg white drainage. This control is provided with a minimal amount of control structure with the principal control being provided by two short cams and a cooperating spring means on the cracking head. Additionally, a relatively simple and improved cracking head-separator combination is described where the relative positions of the cracking head and of the separator are adjusted for movement through preferred relative positions to insure rapid efficient and complete drainage with gentle control of the yolk transfer.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described my invention, I claim:

1. An improved egg cracking head for mounting on an endless conveyor on an egg cracking machine comprising the combination of:

means for mounting the cracking head on the conveyor;

knife means comprising a pair of knives moveably mounted on said cracking head for cracking the egg shells;

means for supporting an egg on said cracking head;

means for moving the knives into the egg to crack the egg shell;

means for opening the egg support means and the knives thereby moving the cracked shells to a fully opened egg draining position with each of said knives engaging a cracked shell portion; and control means on said head for thereafter moving the egg support means and the cracked shells thereon to an only partially opened final drainage position and for withdrawing said knives away from the cracked shell portions.

2. The egg cracking head as claimed in claim 1 in which said knife means comprises a pair of pivotally mounted egg shell cracking knives.

3. The egg cracking head as claimed in claim 1 in which said egg engaging means comprises a pair of pivotally connected egg support arms.

4. The egg cracking head as claimed in claim 1 in which said opening means comprises cam means positioned to swing said arms away from one another.

5. The egg cracking means as claimed in claim 3 in which said control means comprises a resilient member urging said support arms to the partially opened position.

6. The egg cracking means as claimed in claim 2 in which said control means comprises a resilient member positioned for resisting the movement of said egg support arms to said egg draining position, and positioned for urging said support arms to said final drainage position.

7. An improved egg cracking head for mounting on a conveyor on an egg breaking machine comprising the combination of:

a support member having a portion adapted for connection to the conveyor;

a pair of egg support arms pivotally connected together and mounted on said support member;

holddown means on said egg cracking head for holding an egg in said egg support arms;

a knife pivotally mounted on each of said egg support arms positioned to engage and to crack the shell of an egg held in said support arms;

said egg support arms being adapted to swing about said pivotal connection from a closed position with said knives adjacent to one another to a fully opened position with said knives spaced from one another and with the cracked egg opened;

means on said egg support arms for swinging them to the fully opened position with said knives engaging the cracked egg and for urging them to the fully closed position; and means interconnecting said egg support arms for moving said support arms and the portions of the cracked eggs to a partially opened position intermediate said fully opened and said fully closed positions with said knives withdrawn from the cracked egg.

8. An improved egg cracking head for an egg breaking machine as claimed in claim 7 which further comprises:

an egg separator mounted on said support for movement with said cracking head; and means for moving said egg separator to a first yolk receiving position immediately below said egg cracking head and then to a position spaced downwardly from said first position.

9. The separating means as claimed in claim 8 in which said separator comprises a yolk support mounted above an egg white pan.

10. The separating means as claimed in claim 8 in which said interconnecting means comprises spring means resisting cracking head movement to said fully opened position and urging said cracking head to said less fully opened position.

* * * * *